(12) United States Patent
Aso et al.

(10) Patent No.: US 9,020,749 B2
(45) Date of Patent: Apr. 28, 2015

(54) HOST-VEHICLE RISK ACQUISITION DEVICE AND METHOD

(71) Applicants: Kazuaki Aso, Susono (JP); Toshiki Kindo, Yokohama (JP); Masahiro Harada, Susono (JP)

(72) Inventors: Kazuaki Aso, Susono (JP); Toshiki Kindo, Yokohama (JP); Masahiro Harada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/926,395

(22) Filed: Jun. 25, 2013

(65) Prior Publication Data

US 2013/0289868 A1 Oct. 31, 2013

Related U.S. Application Data

(62) Division of application No. 12/452,395, filed as application No. PCT/IB2008/002149 on Jul. 10, 2008, now Pat. No. 8,504,283.

(30) Foreign Application Priority Data

Jul. 12, 2007 (JP) .................................. 2007-183411

(51) Int. Cl.
  *G05D 1/02* (2006.01)
  *B60T 7/12* (2006.01)
  (Continued)

(52) U.S. Cl.
  CPC .............. *G08G 1/166* (2013.01); *G01S 13/726* (2013.01); *G01S 2013/9353* (2013.01); *G08G 1/16* (2013.01)

(58) Field of Classification Search
  USPC .............. 701/3, 36, 41, 45, 70, 96, 117, 213, 701/301, 300; 340/70, 435, 436, 438, 903, 340/904, 961; 342/70, 71, 107, 174, 455; 280/735
  See application file for complete search history.

(56) References Cited

U.S. PATENT DOCUMENTS

| 4,833,469 A | 5/1989 | David |
| 5,332,057 A | 7/1994 | Butsuen et al. |

(Continued)

FOREIGN PATENT DOCUMENTS

| DE | 102 57 842 A1 | 11/2003 |
| DE | 102005020731 A1 | 11/2006 |

(Continued)

OTHER PUBLICATIONS

International Search Report dated Dec. 29, 2008 for National Phase Application No. PCT/IB2008/002149, filed Jul. 10, 2008.

(Continued)

*Primary Examiner* — James Trammell
*Assistant Examiner* — Majdi Alsomiri
(74) *Attorney, Agent, or Firm* — Oliff PLC

(57) ABSTRACT

A host-vehicle risk acquisition device includes a host-vehicle path acquisition portion that acquires a path of a host-vehicle, and an obstacle path acquisition portion that acquires a plurality of paths of an obstacle existing around the host-vehicle. A collision risk acquisition portion acquires an actual collision risk, which is a collision risk between the host-vehicle and the obstacle when the host-vehicle is in a travel state based on the path of the host-vehicle and the plurality of paths of the obstacle. An offset risk acquisition portion acquires an offset risk, which is a collision risk between the host-vehicle and the obstacle in an offset travel state, which is offset from the travel state of the host-vehicle.

7 Claims, 6 Drawing Sheets

(51) Int. Cl.
  G06F 19/00 (2011.01)
  G06G 7/78 (2006.01)
  G06F 17/10 (2006.01)
  B60Q 1/00 (2006.01)
  G08G 1/16 (2006.01)
  G08G 1/00 (2006.01)
  G01S 3/02 (2006.01)
  G01S 13/72 (2006.01)
  G01S 13/93 (2006.01)

(56) References Cited

U.S. PATENT DOCUMENTS

| | | | |
|---|---|---|---|
| 5,572,428 | A | 11/1996 | Ishida et al. |
| 6,026,347 | A | 2/2000 | Schuster |
| 6,084,508 | A | 7/2000 | Mai et al. |
| 6,169,495 | B1 | 1/2001 | Koike |
| 6,269,307 | B1 | 7/2001 | Shinmura et al. |
| 6,571,176 | B1 | 5/2003 | Shinmura et al. |
| 6,662,108 | B2 | 12/2003 | Miller et al. |
| 6,926,374 | B2 * | 8/2005 | Dudeck et al. ............... 303/191 |
| 7,009,503 | B2 * | 3/2006 | Gross ........................... 340/436 |
| 7,167,787 | B2 | 1/2007 | Bastain et al. |
| 7,369,941 | B2 | 5/2008 | Schiffmann et al. |
| 7,734,419 | B2 | 6/2010 | Kondoh |
| 7,961,084 | B2 | 6/2011 | Aso et al. |
| 7,966,127 | B2 | 6/2011 | Ono et al. |
| 8,090,537 | B2 * | 1/2012 | Nishira et al. ............... 701/301 |
| 8,244,408 | B2 * | 8/2012 | Lee et al. ..................... 700/301 |
| 2002/0087241 | A1 | 7/2002 | Nakano et al. |
| 2002/0135467 | A1 | 9/2002 | Koike |
| 2002/0140551 | A1 | 10/2002 | Gutta et al. |
| 2003/0006889 | A1 | 1/2003 | Koike |
| 2003/0009275 | A1 | 1/2003 | Koike |
| 2003/0204299 | A1 | 10/2003 | Waldis et al. |
| 2004/0090117 | A1 | 5/2004 | Dudeck et al. |
| 2004/0193351 | A1 | 9/2004 | Takahashi et al. |
| 2005/0015203 | A1 | 1/2005 | Nishira |
| 2005/0073438 | A1 | 4/2005 | Rodgers et al. |
| 2005/0197770 | A1 | 9/2005 | Schiffmann et al. |
| 2005/0209766 | A1 | 9/2005 | Perisho, Jr. et al. |
| 2005/0225477 | A1 | 10/2005 | Cong et al. |
| 2006/0111838 | A1 | 5/2006 | Hughes |
| 2006/0247852 | A1 | 11/2006 | Kortge et al. |
| 2007/0027597 | A1 | 2/2007 | Breuel et al. |
| 2007/0106475 | A1 | 5/2007 | Kondoh |
| 2007/0192006 | A1 | 8/2007 | Kimura et al. |
| 2008/0065328 | A1 | 3/2008 | Eidehall et al. |
| 2008/0086269 | A1 | 4/2008 | Joe et al. |
| 2008/0097699 | A1 | 4/2008 | Ono |
| 2008/0192710 | A1 | 8/2008 | Balachandran et al. |
| 2009/0143987 | A1 | 6/2009 | Bect et al. |
| 2010/0030472 | A1 * | 2/2010 | Kindo et al. ................. 701/300 |
| 2010/0235035 | A1 * | 9/2010 | Nishira et al. ............... 701/29 |
| 2011/0015805 | A1 | 1/2011 | Seger |

FOREIGN PATENT DOCUMENTS

| | | |
|---|---|---|
| EP | 1 898 232 A1 | 3/2008 |
| FR | 2889882 A1 | 2/2007 |
| JP | A-03-118698 | 5/1991 |
| JP | A 07-104062 | 4/1995 |
| JP | A-08-335298 | 12/1996 |
| JP | A 09-132093 | 5/1997 |
| JP | A-10-105895 | 4/1998 |
| JP | A-11-120488 | 4/1999 |
| JP | A-11-126294 | 5/1999 |
| JP | A-11-345393 | 12/1999 |
| JP | A-2000-276696 | 10/2000 |
| JP | A 2002-260146 | 9/2002 |
| JP | A-2004-145479 | 5/2004 |
| JP | A-2004-224309 | 8/2004 |
| JP | A-2004-240506 | 8/2004 |
| JP | A-2005-228264 | 8/2005 |
| JP | A 2006-154967 | 6/2006 |
| JP | A-2006-185137 | 7/2006 |
| JP | A-2006-185139 | 7/2006 |
| JP | A-2006-252136 | 9/2006 |
| JP | A 2006-277256 | 10/2006 |
| JP | A-2007-034684 | 2/2007 |
| JP | A-2007-534041 | 11/2007 |
| JP | A-2008-132867 | 6/2008 |
| JP | A-2008-308152 | 12/2008 |
| JP | A-2009-505260 | 2/2009 |
| JP | A-2009-051349 | 3/2009 |
| JP | A-2009-210239 | 9/2009 |
| WO | WO 2005/027076 | 3/2005 |
| WO | WO 2005/037592 A1 | 4/2005 |
| WO | WO 2006/070865 A1 | 7/2006 |
| WO | WO 2007/020358 A2 | 2/2007 |
| WO | WO 2008/120796 A1 | 10/2008 |
| WO | WO 2009/007843 A2 | 1/2009 |

OTHER PUBLICATIONS

Written Opinion of the International Searching Authority dated Dec. 29, 2008 for National Phase Application No. PCT/IB2008/002149, filed Jul. 10, 2008.

Japanese Office Action with English-language Translation dated Apr. 20, 2009 for Japanese Application No. 2007-183411.

Japanese Application No. 2007-088842 filed Mar. 29, 2007 in Japan.

Jan. 24, 2013 Office Action issued in U.S. Appl. No. 12/714,728.

Sep. 19, 2012 Office Action issued in U.S. Appl. No. 12/514,539.

Feb. 9, 2012 Office Action issued in U.S. Appl. No. 12/514,539.

Aug. 25, 2011 Office Action issued in U.S. Appl. No. 12/514,539.

Broadhurst et al., "Monte Carlo Road Safety Reasoning," IEEE Intelligent Vehicle Symposium, Jun. 2005, No. 4, pp. 319-324.

Mar. 6, 2014 Notice of Allowance issued in U.S. Appl. No. 12/714,728.

* cited by examiner

US 9,020,749 B2

HOST-VEHICLE RISK ACQUISITION DEVICE AND METHOD

This is a Divisional of U.S. application Ser. No. 12/452,395 filed Dec. 29, 2009, which is a National Stage of International Application No. PCT/IB2000/002149 filed Jul. 10, 2008, which claims priority to JP2007-183411 filed Jul. 12, 2007. The prior application, including the specifications, drawings and abstracts are incorporated herein by reference in their entirety.

BACKGROUND OF THE INVENTION

1. Field of the Invention

This invention relates to a host-vehicle risk acquisition device and a host-vehicle risk acquisition method that acquire a degree of collision risk between a host-vehicle and an obstacle, such as another vehicle 2. Description of the Related Art A risk acquisition device is available that detects an obstacle around a host-vehicle, determines possibility of collision between the obstacle and the host-vehicle, and outputs the possibility of collision as a degree or risk. For example, a collision avoidance device uses such a risk acquisition device. When there is a possibility of collision between the host-vehicle and an obstacle, the collision avoidance device notifies the driver of a collision risk, or automatically performs deceleration control of the host-vehicle to avoid collision, (See, e.g., Japanese Patent Application Publication 7-104062 (JP-A-7-104062).)

However, the collision avoidance device described in JP-A-104062 calculates only one predicted path of the obstacle, when the obstacle is a mobile object, such as another vehicle. Thus, when the host-vehicle or another vehicle is running on the road where many paths of obstacles are expected, such as an intersection, it is difficult to calculate the possibility of collision, and the accuracy of the degree of risk may be decreased in the case where the degree of risk of the host-vehicle is calculated based on the possibility of collision.

Further, when the degree of risk of the host-vehicle is calculated, the degree of risk of the host-vehicle in the current state can be calculated; however, the degree of risk of the host-vehicle in the other travel states may not be calculated. Thus, the safety degree of the host-vehicle in the other travel state may not be determined.

SUMMARY OF THE INVENTION

The present invention provides a host-vehicle risk acquisition device and method that calculates the degree of risk of the host-vehicle accurately even when the host-vehicle is running at a location where many branching paths are possible to be taken, such as an intersection, and determines the safety degree of the host-vehicle in the travel states other than the current state.

An first aspect of the present invention provides a host-vehicle risk acquisition device including an host-vehicle path acquisition portion that acquires a path of an host-vehicle; an obstacle path acquisition portion that acquires a plurality of paths of an obstacle existing around the host-vehicle; a collision risk acquisition portion that acquires an actual collision risk, which is a collision risk between the host-vehicle and the obstacle when the host-vehicle is in a travel state based on the path of the host-vehicle and the plurality of paths of the obstacle; and an offset risk acquisition portion that acquires an offset risk, which is a collision risk between the host-vehicle and the obstacle in an offset travel state, which is offset from the travel state of the host-vehicle.

According to the first aspect of the present invention, the actual collision risk between the host-vehicle and the obstacle is acquired based on the host-vehicle path and plural paths of the obstacle. Therefore, a collision risk of the host-vehicle may be calculated accurately, even if the vehicle is traveling at a location where many branching paths are possible to be taken, such as an intersection. Further, the actual collision risk between the host-vehicle and the obstacle when the host-vehicle is in a travel state, and the offset risk, which is a risk of collision between the host-vehicle and the obstacle in the offset travel state, are acquired. Thus, by obtaining the offset risk and comparing with the actual collision risk of the host-vehicle and the offset risk, the degree of safety of the host-vehicle with respect to the other travel states may be determined.

The travel state of the host-vehicle may include at least one of a position and a speed of the host-vehicle. Thus, the position or the speed of the host-vehicle may be used as the travel state of the host-vehicle.

Further, host-vehicle risk acquisition device may further includes an offset risk storing portion that stores the offset risk acquired by the offset risk acquisition portion; and a travel state evaluation portion that compares the offset risk stored in the offset risk storing portion with the actual collision risk obtained by the collision risk acquisition portion to evaluate the travel state of the host-vehicle.

When the offset risk stored in the offset risk storing portion is compared with the actual collision risk obtained by the collision risk acquisition portion, it may be considered that, if the difference therebetween is small, the risk degree of the travel state is low, and if the difference therebetween is large, the risk degree of the travel state is high. Accordingly, by comparing the offset risk stored in the offset risk storing portion with the actual collision risk obtained by the collision risk acquisition portion, the travel state in the past may be evaluated.

Further, the travel state evaluation portion may calculate a time variation in a difference between the offset risk stored in the offset risk storing portion and the actual collision risk obtained by the collision risk acquisition portion, and may evaluate the travel state of the host-vehicle based on the calculated time variation in the difference between the offset risk and the actual collision risk.

By evaluating the travel state of the host-vehicle based on the time variation in the difference between the offset risk obtained by the offset risk acquisition portion and the actual collision risk obtained by the collision risk acquisition portion, the travel state of the host-vehicle may be evaluated accurately.

Furthermore, the travel state evaluation portion may evaluate the travel state of the host-vehicle using a mean value and a variance of the time variation in the difference between the offset risk and the actual collision risk By evaluating the travel state of the host-vehicle by using the mean value and the variance of the time variation in the difference between the offset risk and the actual collision risk, the travel states of the host-vehicle may be evaluated more accurately.

A second aspect of the present invention provides a host-vehicle risk acquisition method. A travel state of a host-vehicle is detected. A offset travel state of the host-vehicle, which is offset from the host-vehicle travel state, is calculated. A host-vehicle offset possible path is calculated based on the host-vehicle offset travel state. A plurality of possible paths of an obstacle existing around the host-vehicle is calculated. Further, an offset risk, which is a collision risk between the host-vehicle and the obstacle when the host-vehicle travels on the host-vehicle offset possible path.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
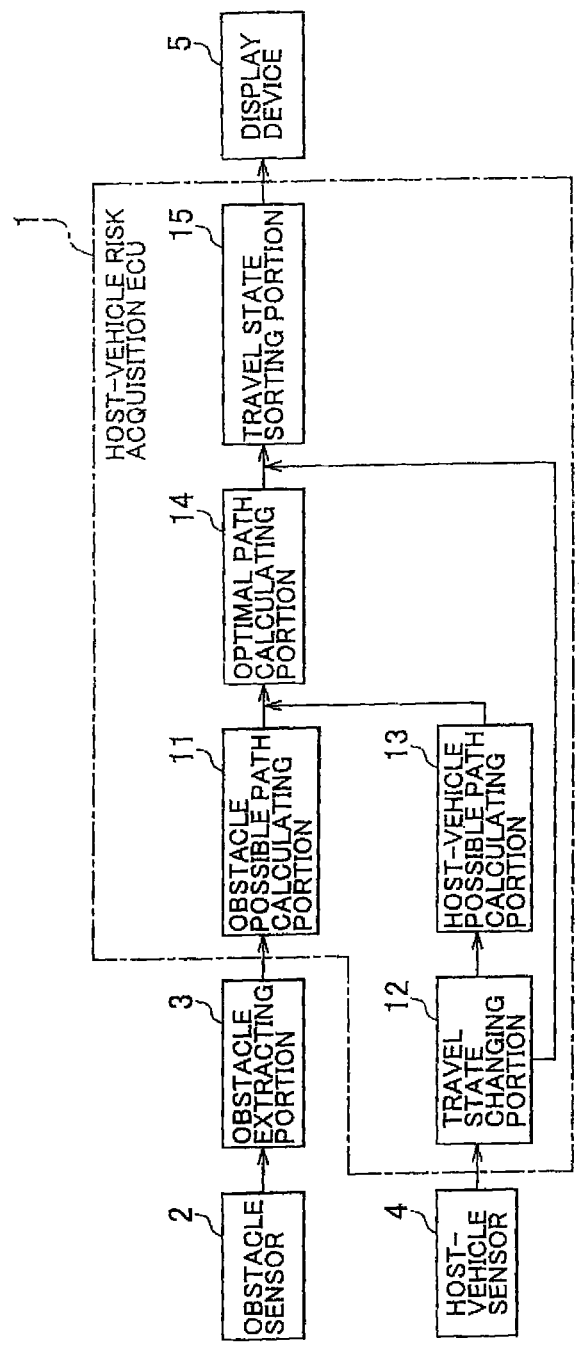
FIG. 1 is a block diagram illustrating a configuration of a host-vehicle risk acquisition device according to a first embodiment of the present invention.

Embodiments of the present invention will be described below with reference to the attached drawings. It should be noted that in the description of the drawings, the same reference numerals are used to denote the same elements, and repetitive description is omitted. Also, for the convenience of illustration, dimensional ratios in the drawings do not necessarily coincide with those in the description.

FIG. 1 is a block diagram illustrating a configuration of a host-vehicle risk acquisition ECU according to a first embodiment of the present invention. As shown in FIG. 1, a host-vehicle risk acquisition ECU 1, which may be regarded as a host-vehicle risk acquisition device of the claimed invention, is a computer of an automotive device that is electronically controlled, and includes a CPU (Central Processing Unit), a ROM (Read Only Memory), a RAM (Random Access Memory), an input/output interface, and the like. The host-vehicle risk acquisition ECU 1 includes an obstacle possible path calculating portion 11, a travel state changing portion 12, a host-vehicle possible path calculating portion 13, an optimal path calculating portion 14, and a travel state sorting portion 15. Further, an obstacle sensor 2 is connected to the host-vehicle risk acquisition ECU 1 via an obstacle extracting portion 3, and also a host-vehicle sensor 4 is connected to the host-vehicle risk acquisition ECU 1. Further, a display device 5 is connected to the host-vehicle risk acquisition ECU 1.

The obstacle sensor 2 may include a millimeter wave radar sensor, a laser radar sensor, an image sensor, and the like, and detects obstacles such as other vehicles or passersby around the host-vehicle. The obstacle sensor 2 transmits information related to any detected obstacle to the obstacle extracting portion 3 (hereinafter, referred to as "obstacle-related information").

The obstacle extracting portion 3 extracts obstacles from the obstacle-related information transmitted from the obstacle sensor 2, and outputs obstacle information such as the position or speed of the obstacle to the obstacle possible path calculating portion 11 in the host-vehicle risk acquisition ECU 1. If, for example, the obstacle sensor 2 is a millimeter-wave radar sensor or laser radar sensor, the obstacle extracting portion 3 detects an obstacle based on the wavelength or the like of the wave reflected from the obstacle. If the obstacle sensor 2 is an image sensor, the obstacle extracting portion 3 extracts, for example, another vehicle as an obstacle from a captured image by pattern matching or other suitable technique.

The host-vehicle sensor 4 may include, for example, a position sensor, a speed sensor, a yaw rate sensor, and detects a current travel state of the host-vehicle. The host-vehicle sensor 4 transmits information related to the detected current travel state of the host-vehicle (hereinafter, referred to as "host-vehicle travel state information") to the travel state changing portion 12 of the host-vehicle risk acquisition ECU 1. The travel state information of the host-vehicle at this time may include, for example, the position, speed or yaw rate of the host-vehicle.

The obstacle possible path calculating portion 11 stores plural behaviors of each obstacle assumed to be taken during a fixed time, and calculates plural paths of an obstacle that are predicted based on the obstacle information output from the obstacle extracting portion 3 and the stored behaviors. The obstacle possible path calculating portion 11 outputs the information related to the paths of the obstacle to the optimal path calculating portion 14 (hereinafter, referred to as the "obstacle path information").

The travel state changing portion 12 calculates offset travel states of the host-vehicle. Each offset travel state of the host-vehicle, which is offset from the current travel state, is calculated based on the host-vehicle travel state information transmitted from the host-vehicle sensor 4 by adding a small offset value (amount of displacement) to the current travel state. Here, offset of the travel state is realized by offsetting or changing the position, speed or direction of the host-vehicle, for example. The travel state changing portion 12 thus changes the current travel state of the host-vehicle to the plural offset travel states of the host-vehicle. Further, the travel state changing portion 12 outputs offset travel state information including the current travel state and the offset travel states of the host-vehicle to the host-vehicle possible path calculating portion 13 and the travel state sorting portion 15.

The host-vehicle possible path calculating portion 13 calculates host-vehicle possible paths based on the current travel state and the offset travel states of the host-vehicle in the host-vehicle offset travel state information output from the travel state changing portion 12. Here, N-possible paths are calculated for each of the current travel state and the offset travel states of the host-vehicle. The host-vehicle possible path calculating portion 13 sends host-vehicle possible path information including the calculated host-vehicle possible paths to the optimal path calculating portion 14.

The optimal path calculating portion 14 calculates optimal paths based on the obstacle path information output from the obstacle possible path calculating portion 11 and the host-vehicle possible path information output from the host-vehicle possible path calculating portion 13. Each optimal path is a path of the host-vehicle with the minimum collision probability between the host-vehicle and other vehicles among the possible paths calculated based on one of the current travel state and offset travel states of the host-vehicle. The optimal path calculating portion 14 outputs optimal collision probability information to the travel state sorting portion 15. The optimal collision probability information includes the optimal path collision probability, which is a collision probability of the calculated optimal path of the host-vehicle.

The travel state sorting portion 15 searches for or obtains a preferable travel state of the host-vehicle and obtains a collision probability indicating the degree of risk of the host-vehicle based on the host-vehicle offset travel state information output from the travel state change portion 12 and the optimal collision probability information output from the optimal path calculating portion 14. Here, a degree of current collision risk and degrees of offset risk are obtained as the collision probability. The degree of current collision risk is a collision probability between the host-vehicle and other vehicles on the host-vehicle possible paths calculated based on the current travel state of the host vehicle. Each of the degrees of offset risk is a collision probability between the host-vehicle and other vehicles on the host-vehicle possible paths calculated based on one of the plural offset travel states of the host-vehicle. The travel state sorting portion 15 outputs host-vehicle preferable travel state information based on the obtained preferable travel state of the host-vehicle to the display device 5. The travel state sorting portion 15 may be regarded as both of the collision risk acquisition portion and the offset risk acquisition portion of the claimed invention.

The display device 5 includes, for example, a liquid crystal display or a display on a front glass. The display device 5 highlights the preferable travel state of the host-vehicle based on the host-vehicle preferable travel state information output from the travel state sorting portion 15. Here, the highlight may be realized by changing color, increasing brightness, or thickening lines, as compared with other displayed objects.

Figure 2:
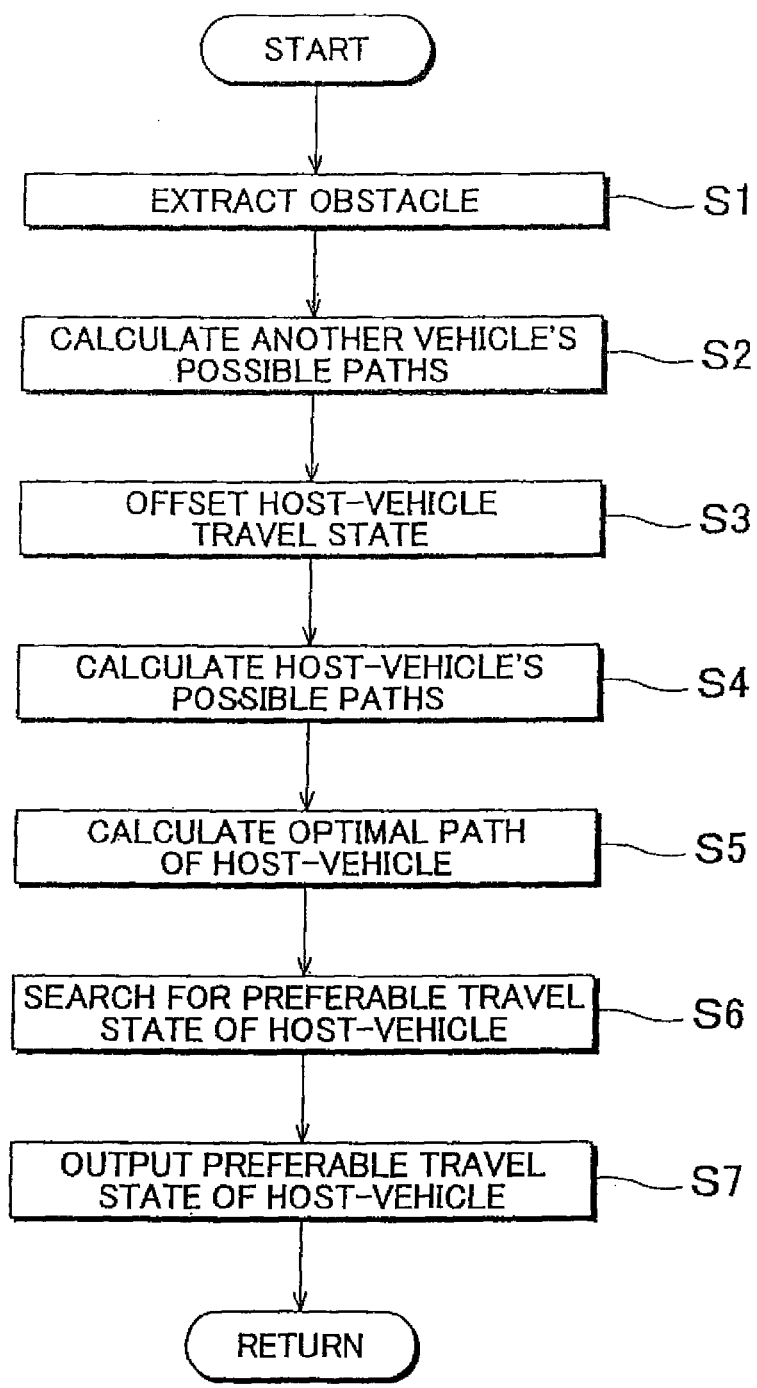
FIG. 2 is a flowchart illustrating an operation of the host-vehicle risk acquisition device according to the first embodiment.

An operation of the host-vehicle risk acquisition device of the embodiment having the above described configuration will be described below. FIG. 2 is a flowchart illustrating the operation of the host-vehicle risk acquisition device. As shown in FIG. 2, in the host-vehicle risk acquisition device, the obstacle extracting portion 3 extracts obstacles around the host-vehicle based on the obstacle-related information transmitted from the obstacle sensor 2 (S1). At this time, another vehicle is extracted as the obstacle. If other vehicles are included in the obstacle-related information, the obstacle extracting portion 3 extracts all of the other vehicles.

After one of the other vehicles is extracted as the obstacle, the obstacle possible path calculating portion 11 calculates plural possible paths along which the other vehicle may move (S2). The possible paths along which the other vehicle may move are calculated as trajectories in a time-space defined by time and space for each of the other vehicles. In this case, as the possible paths along which the other vehicle may move, rather than specifying a given arrival point and then calculating the paths to this arrival point, paths in which the other vehicle will move until a predetermined moving time elapses are obtained. Generally, on the road where the host-vehicle travels, there is no place where safety is guaranteed or secured. Hence, even when arrival points for the host-vehicle and the other vehicle are obtained, in order to determine the possibility of collision between the host-vehicle and the other vehicle, this does not necessarily ensure reliable collision avoidance.

Figure 3:
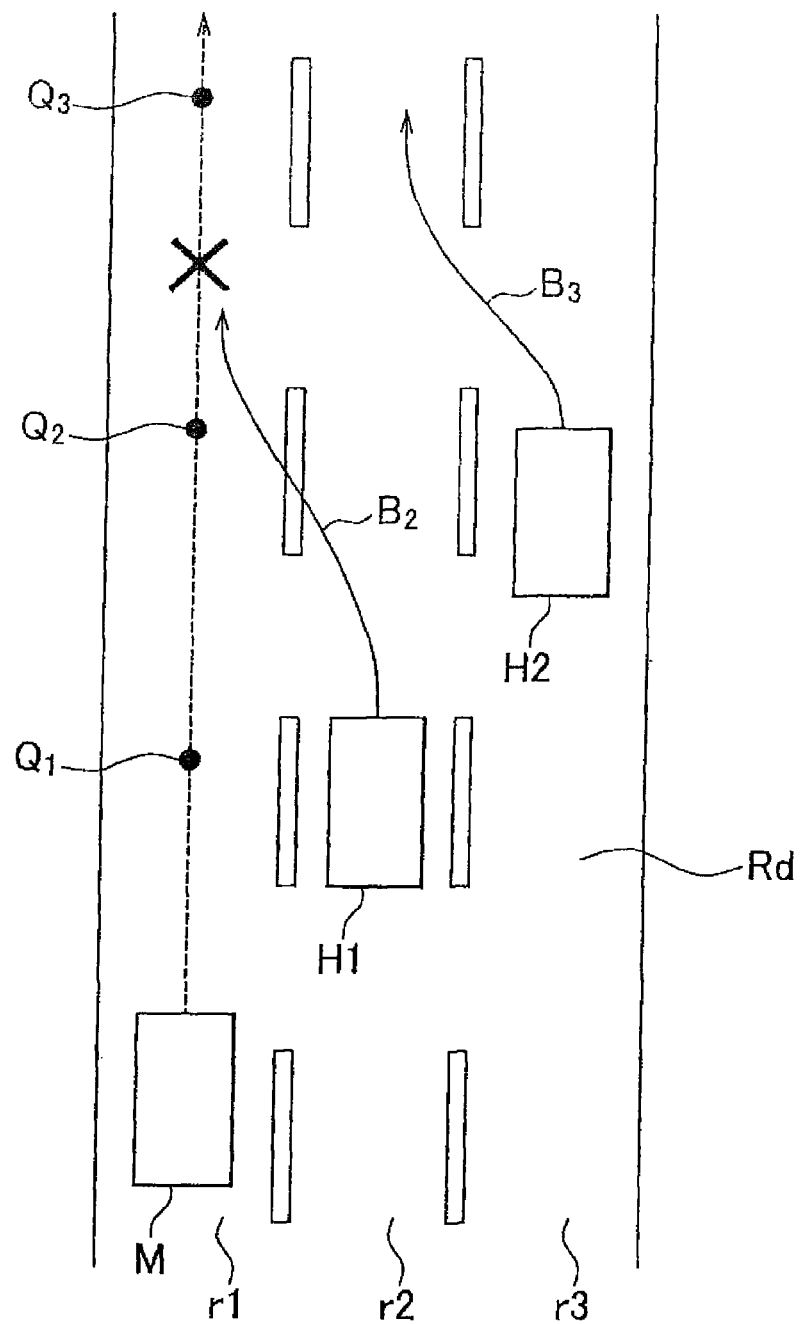
FIG. 3 is a view schematically showing travel states of the host-vehicle and other vehicles.

For example, take the case shown in FIG. 3, where, on a three-lane road Rd, a host-vehicle M is traveling in a first lane r1, a first other vehicle H1 is traveling in a second lane r2, and a second other vehicle H2 is traveling in a third lane r3. At this time, in order to avoid collision between the host-vehicle M and the other vehicles H1, H2 respectively traveling in the second and third lines r2, r3, it would be appropriate for the host-vehicle M to move to positions Q1, Q2, Q3. However, if the second other vehicle H2 takes a path B3 so as to change to the second lane r2, the first other vehicle H1 will presumably take a path B2 to avoid collision with the second other vehicle H2 and thus will enter the first lane r1. In this case, if the host-vehicle M arrives at the positions Q1, Q2, Q3, there is a danger of collision with the first other vehicle H1.

Figure 4:
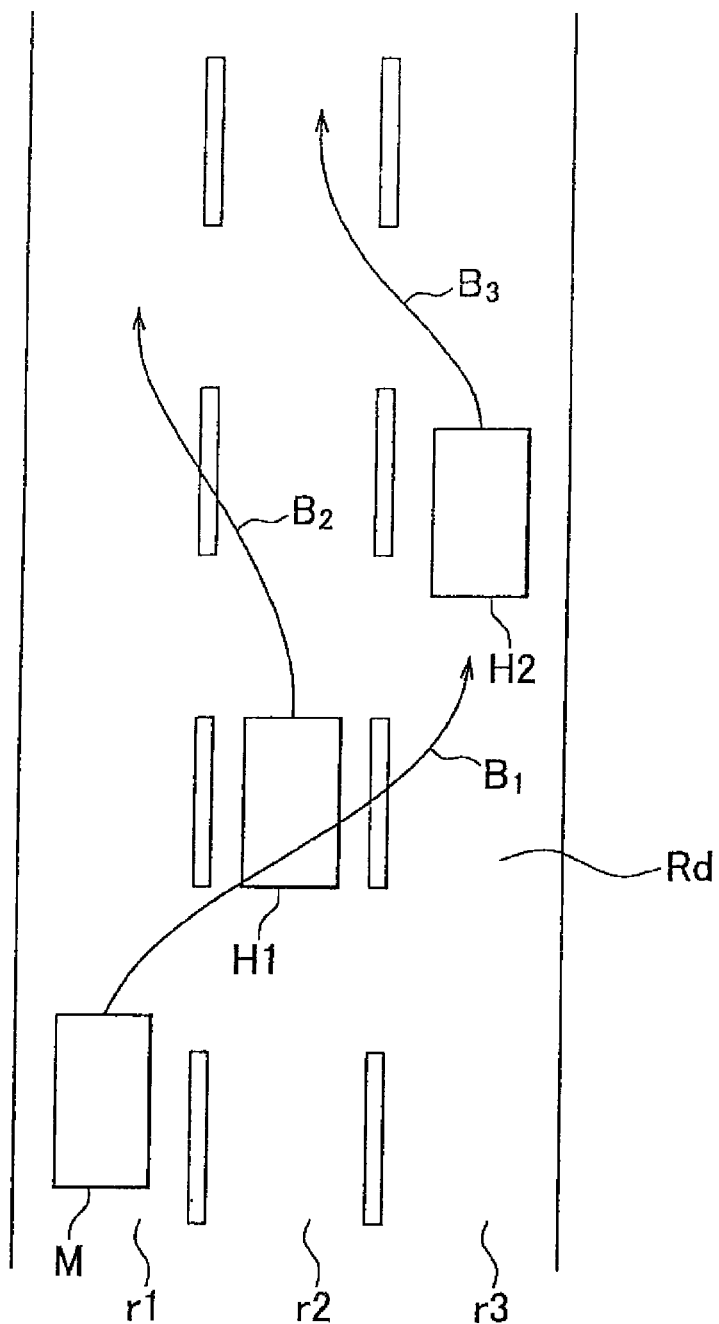
FIG. 4 is a view schematically showing possible paths that may be taken by a host-vehicle.

Accordingly, rather than setting arrival positions with respect to the host-vehicle and the other vehicle in advance, the paths of the host-vehicle and other vehicle are predicted as necessary. By predicting the paths of the host-vehicle and other vehicles as needed, it is possible to properly avoid danger to the host-vehicle M during travel and ensure safety by taking a path B1, shown in FIG. 4, as the path of the host-vehicle.

While in the above-described prediction, possible paths along which the other vehicle will move until a predetermined moving time elapses are specified, alternatively, possible paths of the other vehicle until the travel distance traveled by the other vehicle reaches a predetermined distance may be obtained. In this case, the predetermined distance may be changed as appropriate in accordance with the speed of the other vehicle (or the speed of the host-vehicle).

Possible paths for other vehicles are calculated as follows for each such other vehicle. An initialization process is performed whereby the value of a counter k for identifying another vehicle is set to 1, and the value of a counter n indicating the number of times a possible path is generated with respect to the same other vehicle is set to 1. Subsequently, the position and moving state (speed and moving direction) of the other vehicle based on other vehicle information (obstacle information) transmitted from the obstacle sensor 2 and extracted from other vehicle related information (obstacle-related information) are set to the initial state.

Subsequently, from among a plurality of behaviors that may be selected as behaviors of the other vehicle assumed to be taken during a fixed time $\Delta t$ after the initialization, one behavior is selected in accordance with a behavior selection probability assigned to each behavior. The behavior selection probability with which one behavior is selected is defined by, for example, associating elements of a set of behaviors that may be selected with predetermined random numbers. In this sense, different behavior selection probabilities may be assigned to individual behaviors, or an equal probability may be assigned to all the elements of a set of behaviors. Also, the behavior selection probability may be made dependent on the position and travel state of the other vehicle or the surrounding road condition.

Such selection of a behavior of the other vehicle assumed to be taken during the fixed time $\Delta t$ based on the behavior selection probability is repeated, and a behavior of the other vehicle taken until the elapse of a predetermined time over which the other vehicle moves is selected. One possible path for the other vehicle is calculated based on the behavior of the other vehicle thus selected.

Upon calculating one possible path for the other vehicle, a plurality of (N) possible paths for the other vehicle are calculated through the same procedure. Even when the same procedure is employed, because one behavior is selected in accordance with a behavior selection probability assigned to each behavior, different possible paths are calculated in most cases. The number of possible paths calculated at this time may be determined in advance as, for example, 1000 (N=1000). Of course, the number of the plurality of possible paths calculated may be different, for example, between several hundreds and several tens of thousand. The possible paths thus calculated are set as the predicted paths of the other vehicle.

If a plurality of other vehicles has been extracted, possible paths are calculated for each of the plurality of other vehicles.

Once the calculation of the possible paths of the other vehicle is completed, the travel state changing portion 12 calculates the offset travel state of the host-vehicle, which is offset from the current travel state of the host-vehicle (S3). The offset of the travel state of the host-vehicle is performed by slightly changing the position, speed, yaw rate or the like of the host-vehicle transmitted from the host-vehicle sensor 4. Thus, an offset position, offset speed, offset yaw rate or the like of the host-vehicle is calculated by slightly changing the current position, speed, yaw rate or the like of the host-vehicle. At this time, a plurality of offset travel states of the host-vehicle is calculated.

Once the offset travel states of the host-vehicle are calculated, possible paths of the host-vehicle are calculated (S4). The host-vehicle possible paths are calculated based on the host-vehicle offset travel state information output from the travel state changing portion 12.

Each possible path for the host-vehicle is calculated based on the behavior of the host-vehicle that is assumed to be taken during the fixed time Δt, from the current travel state and the offset travel state of the host-vehicle in the host-vehicle offset travel state information output from the travel state changing portion 12. The host-vehicle possible paths are calculated for each of the current travel state and the plurality of offset travel states of the host-vehicle. The behavior of the host-vehicle that is assumed to be taken during the fixed time Δt is obtained by using a behavior selection probability assigned to each of a plurality of behaviors that are assumed to be taken by the current travel state and host-vehicle, relative to the offset travel state of the host-vehicle.

For example, the behavior selection probability is set such that if the host-vehicle offset travel state indicates that the host-vehicle is traveling at high speed, a behavior in which the distance traveled by the host-vehicle becomes large is likely to be selected, and if the yaw rate has gone to either the left or right, a behavior in which the host-vehicle faces in that direction is likely to be selected. By selecting a behavior by using a speed or yaw rate as the offset travel state of the host-vehicle, the path of the host-vehicle may be accurately predicted. Alternatively, a vehicle speed and estimated curve radius may be obtained based on the host-vehicle offset travel state information output from the travel state changing portion 12, and the possible path of the host-vehicle may be calculated from the vehicle speed and the estimated curve radius. The behavior selection probabilities for all the behavior may be the same.

After the host-vehicle possible paths are calculated, the optimal path calculating portion 14 calculates a collision probability between the host-vehicle and the other vehicle for each possible path calculated based on the current travel state of the host-vehicle, and a collision probability between the host-vehicle and the other vehicle for each possible path calculated based on each of the plural offset travel states of the host-vehicle (S5). Now, focus on a single offset travel state of the host vehicle. An example of the possible paths for the other vehicle calculated in step 2 and the possible paths for the host-vehicle calculated in step S4 based on the single offset travel state of the host-vehicle is represented by a three-dimensional space shown in FIG. 5. In the three-dimensional space shown in FIG. 5, the position of a vehicle is represented on an x-y plane defined by an x-axis and a y-axis, with a t-axis set as the time axis. Therefore, possible paths of the other vehicle and possible paths for the host-vehicle are represented by (x, y, t) coordinates, and trajectories obtained by projecting the respective paths of the other vehicle and host-vehicle onto the x-y plane are the travel trajectories in which the other vehicle and the host-vehicle are predicted to travel.

Figure 5:
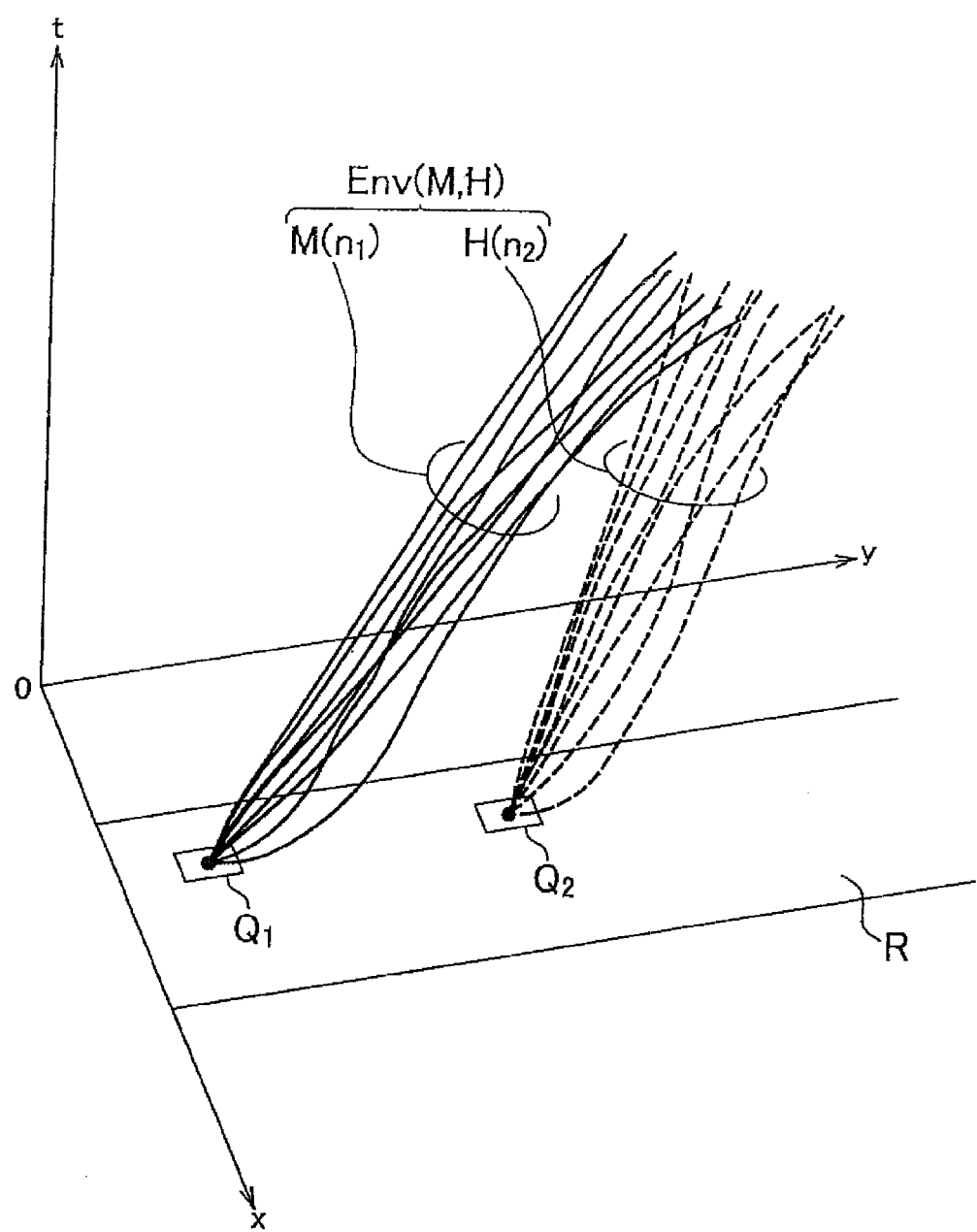
FIG. 5 is a graph showing the configuration of a time-space environment.

The possible paths for the other vehicle and the host-vehicle which are thus calculated are expressed in the space shown in FIG. 5 in this way, thus forming a time-space environment including a set of possible paths that can be taken by a plurality of vehicles (the other vehicle and the host-vehicle) that exist within a predetermined range in three-dimensional time-space. A time-space environment Env(M, H) shown in FIG. 5 represents a set of possible paths for the host-vehicle M and a set of possible paths for the other vehicle H, and includes a possible path set {M(n1)} for the host-vehicle M and a possible path set {H(n1)} for the other vehicle H. More specifically, the time-space environment Env(M, H) represents a time-space environment in case where the host-vehicle M and the other vehicle H are traveling in the +y-axis direction on a smooth and linear road R such as an expressway. Because possible paths are obtained independently for each of the host-vehicle H and the other vehicle M without taking correlation between the host-vehicle M and the other vehicle H, the possible passes for these two vehicles may sometimes cross in time-space.

Once the possible paths for each of the host-vehicle M and the other vehicle H are obtained, the collision probability between the host-vehicle M and the other vehicle H is determined. If a possible path for the host-vehicle M and a possible path for the other vehicle cross, this means that a collision will occur between the host-vehicle M and the other vehicle H. In this regard, a possible path for each of the host-vehicle M and the other vehicle H is determined based on a predetermined behavior selection probability. Therefore, based on the number of possible paths that cross a possible path for the host-vehicle M out of the plural possible paths for the other vehicle H, it is possible to determine the probability of collision between the host-vehicle M and the other vehicle H. For example, if 1000 possible paths for the other vehicle H are calculated, and 5 possible paths out of the 1000 possible paths cross a possible path of the host-vehicle M, the collision probability (collision possibility) PA is calculated to be 0.5%. Stated conversely, the remaining 99.5% is the probability of no collision between the host-vehicle M and the other vehicle H (no-collision probability).

When a plurality of the other vehicles H has been extracted, the collision probability PA of the host-vehicle with at least one of the plurality of the other vehicles may be obtained by Equation (1) below.

$$P_A = 1 - \prod_{i=1}^{k} (1 - P_{Ai}) \quad (1)$$

Here, k represents the number of the other vehicles extracted, and PAk represents the probability of collision with the k-th vehicle. In this way, a plurality of possible paths for the other vehicle H are calculated, and the possibility of collision between the host-vehicle M and the other vehicle H is calculated by using the plurality of possible paths for the other vehicle H, thus calculating a wide range of paths that may be taken by the other vehicle. Therefore, a collision probability may be calculated by also taking into account cases where there is a large change in the path of the other vehicle, such as when the vehicles are traveling at a branching location such as an intersection.

The path with the lowest collision probability in the calculated plural collision probabilities is determined as an optimal travel path. Then, the collision probability between the host-vehicle and the other vehicle of the optimal travel path is determined as an optimal path collision probability of the host-vehicle. The optimal path calculating portion 14 calculates, through the same process of step S5, an optimal path collision probability between the host-vehicle and the other vehicle among possible paths calculated based on each of the current travel state and the plural offset travel states of the host-vehicle.

Once the optimal path collision probabilities between the host-vehicle and the other vehicle are respectively obtained for the plural sets of possible paths of the host-vehicle respectively calculated based on the current travel state and the plural offset travel states of the host-vehicle, the travel state sorting portion 15 determines a preferable travel state of the host-vehicle based on the plural optimal path collision probabilities for the host-vehicle and the plural offset travel states of the host-vehicle in the host-vehicle offset travel state information output from the travel state changing portion 12. At this time, the preferable travel state of the host-vehicle is determined by comparing the optimal path collision probabilities of the host-vehicle respectively corresponding to the plural offset travel states of the host-vehicle, and searching for the preferable travel state for the host-vehicle (S6). The preferable travel state of the host-vehicle is represented by the offset travel states of the host-vehicle arranged in the ascending order of the optimal path collision probability of the host-vehicle. By searching for or obtaining the preferable travel state of the host-vehicle in this way, the degree of risk of the host-vehicle is accurately calculated, and it is possible to determine which travel state increases the degree of safety.

The travel state sorting portion 15 outputs preferable host-vehicle travel state information including the calculated preferable travel state of the host-vehicle to the display device 5 (S7). The display device 5 displays travel states of the host-vehicle, such as positions of the host-vehicle, in the ascending order of the optimal path collision probability. By displaying the travel states of the host-vehicle in the ascending order of the optimal path collision possibility, the preferable travel state of the host-vehicle is shown to the driver.

Figure 6:
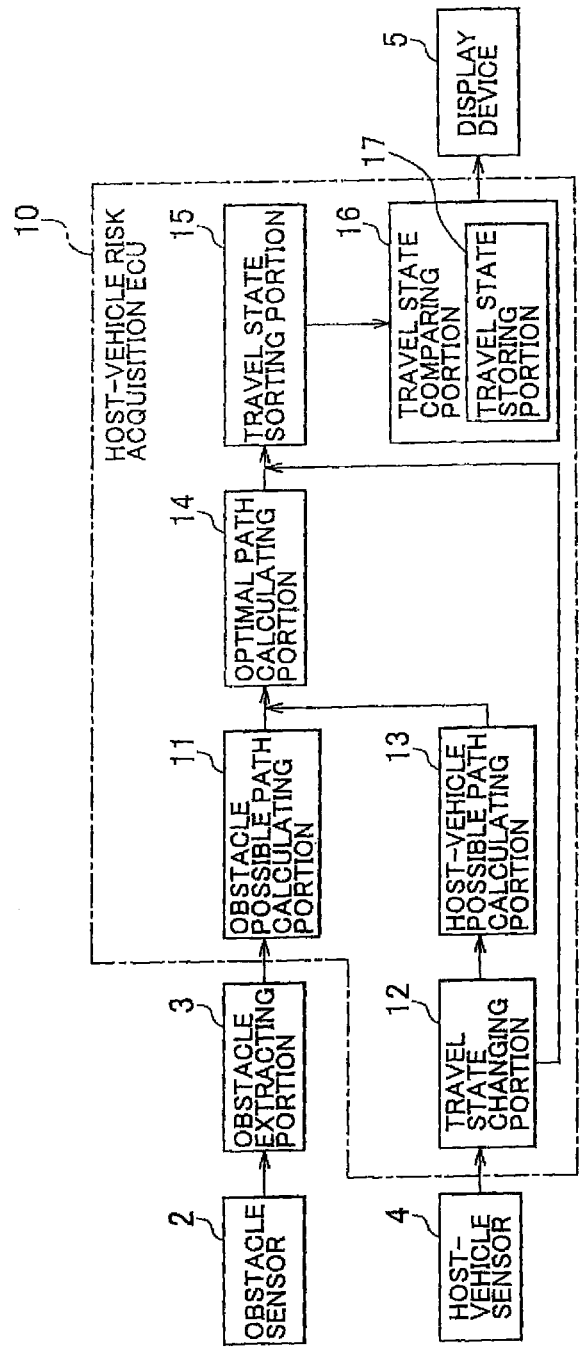
FIG. 6 is a block diagram illustrating a configuration of a host-vehicle risk acquisition device according to a second embodiment of the present invention.

Next, a second embodiment of the present invention will be described. FIG. 6 is a block diagram illustrating a configuration of a host-vehicle risk acquisition ECU according to a second embodiment of the present invention. As shown in FIG. 6, the host-vehicle risk acquisition ECU 10, which may be regarded as the host-vehicle risk acquisition device of the claimed invention, is principally different from that of the first embodiment in regard that a travel state comparing portion 16 is provided.

In addition, the travel state sorting portion 15 outputs preferable host-vehicle travel state information including the offset travel states of the host-vehicle arranged in the ascending order of the optimal path collision probability to the travel state comparing portion 16.

The travel state comparing portion 16 includes a travel state storing portion 17 that stores the preferable travel states of the host-vehicle in the preferable host-vehicle travel state information output from the travel state sorting portion 15. At this time, the preferable host-vehicle travel state information output from the travel state sorting portion 15 includes an actual travel state of the host-vehicle, which may be calculated from the current travel state of the host-vehicle.

Subsequently, when the travel state sorting portion 15 outputs the preferable host-vehicle travel state information, the travel state comparing portion 16 compares the actual travel state of the host-vehicle in a current-cycle with the preferable travel state of the host-vehicle in the previous-cycle. The actual travel state of the host-vehicle in the current-cycle is included in the preferable host-vehicle travel state information output from the travel state sorting portion 15. The preferable travel state of the host-vehicle in the previous-cycle is included in the preferable host-vehicle travel state information stored in the travel state storing portion.

Based on the result of the comparison, the travel state of the host-vehicle between when the preferable host-vehicle travel state information is output in the previous-cycle and when the preferable host-vehicle travel state information is output in the current-cycle is evaluated. Further, the travel state comparing portion 16 outputs the travel state evaluation information including the evaluation of travel state to the display device 5. The display device 5 displays the evaluation of travel state included in the travel state evaluation information. Other portions are similar to those of the first embodiment.

An operation of the host-vehicle risk acquisition device according to the second embodiment having the above-described configuration will be explained by comparison with the operation in the first embodiment. The operation from when obstacles around the host-vehicle are extracted (S1) to when the preferable travel state of the host-vehicle is determined (S6) is similar to that of the first embodiment.

Subsequently, once the preferable travel state of the host-vehicle is obtained, the travel state sorting portion 15 determines outputs the preferable host-vehicle travel state information including the preferable travel state of the host-vehicle to the travel state comparing portion 16. The travel state comparing portion 16 stores the preferable host-vehicle travel state information output by the travel state sorting portion 15 into the travel state storing portion 17.

Further, the travel state comparing portion 16 compares the actual travel state of the host-vehicle with the most preferable travel state (having the minimum optimal collision probability) in a piece of the preferable host-vehicle travel state information stored in the travel state storing portion 17 at a certain time point. For example, if the optimal path collision probability of the actual travel state of the host-vehicle coincides with the optimal path collision probabilities of the most preferable travel states in all pieces of preferable host-vehicle travel state information respectively stored at some time points, it is possible to evaluate that the host-vehicle is in the safest travel state.

Further, when the pieces of the preferable host-vehicle travel state information stored in the travel state storing portion are arranged in the order of time from past to present, if the difference between the optimal path collision probability of the most preferable travel state in the preferable host-vehicle travel state information and the optimal path collision probability of the actual travel state of the host-vehicle increases from past to present, it may be evaluated that the host-vehicle is gradually apart from a safe state as the time elapses. On the contrary, it the difference decreases, it is evaluated that the host-vehicle is approaching a safer travel state from an initial travel state that is not the safest state.

In this way, the travel state may be evaluated by focusing on the change in the travel state of the host-vehicle over time.

Further, if a portion that calculates a mean value or variance of the time variation in the difference between the optimal path collision probability in the most preferable travel state and the optimal path collision probability of the actual host-vehicle is added to the travel state comparing portion 16, the stability of safety degree of the host-vehicle is evaluated by using the mean value and the variance. For example, a large variance indicates that the travel state of the host-vehicle is rapidly and repeatedly changing between safe states and dangerous states. In this case, the travel state is evaluated that host-vehicle is in a state in which the behavior is unpredictable by others. On the other hand, a small variance indicates that the travel state is either in a consistently safe state or a consistently dangerous state. In this case, accordingly, although there is difference between safety and danger, the travel state is evaluated to be easily predictable by others.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention. For example, while another vehicle is assumed as an obstacle in the above-described embodiments, a living being such as a passerby may be assumed as an obstacle.

The invention claimed is:

1. A host-vehicle risk acquisition method comprising:
   detecting a travel state of a host-vehicle;
   calculating using a processor an offset travel state of the host-vehicle which is offset from the host-vehicle travel state;
   calculating using the processor a host-vehicle offset possible path based on the host-vehicle offset travel state, the host-vehicle offset possible path being an offset trajectory that the host-vehicle is able to travel;
   calculating using the processor a plurality of possible paths of an obstacle existing around the host vehicle, the possible paths being paths in which the obstacle is capable of moving until a predetermined moving time elapses;
   calculating using the processor an offset risk, which is a collision risk between the host-vehicle and the obstacle when the host-vehicle travels on the host-vehicle offset possible path, and
   displaying the host-vehicle offset possible path.

2. The host-vehicle risk acquisition method according to claim 1, wherein the travel state of the host-vehicle includes at least one of a position and speed of the host-vehicle.

3. The host-vehicle risk acquisition method according to claim 2, further comprising:
   calculating using the processor a host-vehicle possible path based on the detected host-vehicle travel state, the host-vehicle possible path being a trajectory that the host-vehicle is able to travel;
   calculating using the processor an actual collision risk, which is a collision risk between the host-vehicle and the obstacle when the host-vehicle travels on the host-vehicle possible path;
   storing the calculating offset risk; and
   comparing the actual collision risk calculated in a current cycle with the offset risk stored in a previous cycle to evaluate the travel state of the host-vehicle.

4. The host-vehicle risk acquisition method according to claim 1, further comprising:
   calculating using the processor a host-vehicle possible path based on the detected host-vehicle travel state, the host-vehicle possible path being a trajectory that the host-vehicle is able to travel;
   calculating using the processor an actual collision risk, which is a collision risk between the host-vehicle and the obstacle when the host-vehicle travels on the host-vehicle possible path;
   storing the calculating offset risk; and
   comparing the actual collision risk calculated in a current cycle with the offset risk stored in a previous cycle to evaluate the travel state of the host-vehicle.

5. The host-vehicle risk acquisition method according to claim 1, further comprising:
   calculating additional host-vehicle offset possible path using the processor based on the host-vehicle offset travel state, the additional host-vehicle offset possible path being an offset trajectory that the host-vehicle is able to travel;
   calculating using the processor an additional offset risk, which is a collision risk between the host-vehicle and the obstacle when the host-vehicle travels on the additional host-vehicle offset possible path, and
   displaying the host-vehicle offset possible path and the host-vehicle offset possible path in an order of having less offset risk.

6. The host-vehicle risk acquisition method according to claim 5, wherein each of the offset risk and the additional offset risk is determined by calculating a number of possible collision between (i) each of the host-vehicle offset possible path and the additional host-vehicle offset possible path, and (ii) each of the plurality of possible paths of the obstacle.

7. A host-vehicle risk acquisition method comprising:
   detecting a travel state of a host-vehicle;
   calculating using a processor an offset travel state of the host-vehicle which is offset from the host-vehicle travel state;
   calculating using the processor a host-vehicle offset possible path based on the host-vehicle offset travel state, the host-vehicle offset possible path being an offset trajectory that the host-vehicle is able to travel;
   calculating using the processor a plurality of possible paths of an obstacle existing around the host-vehicle, the possible paths being paths in which the obstacle is capable of moving until a predetermined moving time elapses;
   calculating using the processor an offset risk, which is a collision risk between the host-vehicle and the obstacle when the host-vehicle travels on the host-vehicle offset possible path, and
   calculating and outputting, using the processor, host-vehicle preferable travel state information based on the offset risk.

* * * * *